(12) United States Patent
Coles

(10) Patent No.: US 6,181,373 B1
(45) Date of Patent: *Jan. 30, 2001

(54) SECURITY SYSTEM WITH METHOD FOR LOCATABLE PORTABLE ELECTRONIC CAMERA IMAGE TRANSMISSION TO A REMOTE RECEIVER

(76) Inventor: Christopher F. Coles, 23 Clifton Road, Salisbury SP2 7BP (GB)

(*) Notice: Under 35 U.S.C. 154(b), the term of this patent shall be extended for 0 days.

This patent is subject to a terminal disclaimer.

(21) Appl. No.: 09/013,367

(22) Filed: Jan. 26, 1998

Related U.S. Application Data

(63) Continuation of application No. 07/720,865, filed on Sep. 11, 1992, now Pat. No. 5,712,679.

(30) Foreign Application Priority Data

Jan. 16, 1989 (GB) .................................................. 8900837
Jun. 2, 1989 (GB) .................................................. 891288
Jan. 16, 1990 (WO) .................................. PCT/GB90/00062

(51) Int. Cl.[7] .............................. H04N 7/20; H04N 7/18
(52) U.S. Cl. ............................................ 348/158; 348/143
(58) Field of Search .................................... 348/158, 143, 348/148, 149, 151

(56) References Cited

U.S. PATENT DOCUMENTS

| 3,440,635 | 4/1969 | Hull ..................................... 340/277 |
|---|---|---|
| 3,984,625 | * 10/1976 | Camras ................................ 348/158 |
| 4,001,805 | 1/1977 | Golbe ................................... 340/280 |
| 4,097,893 | * 6/1978 | Camras ................................ 348/158 |
| 4,445,118 | 4/1984 | Taylor et al. ........................ 343/357 |
| 4,516,157 | * 5/1985 | Campbell ............................. 348/158 |
| 4,605,959 | * 8/1986 | Colbaugh ............................. 348/158 |
| 4,611,198 | * 9/1986 | Levinson et al. ..................... 340/539 |
| 4,701,797 | * 10/1987 | Ferreira ................................ 348/724 |
| 4,802,008 | 1/1989 | Walling ................................ 358/141 |
| 4,814,711 | 3/1989 | Olsen et al. ......................... 324/331 |
| 4,819,053 | 4/1989 | Halavais .............................. 342/353 |
| 4,884,132 | 11/1989 | Morris et al. ......................... 358/93 |
| 5,222,152 | * 6/1993 | Fishbine et al. ..................... 382/127 |
| 5,677,979 | * 10/1997 | Squicciarini et al. ................. 386/46 |
| 5,712,679 | 1/1998 | Coles .................................. 348/158 |

FOREIGN PATENT DOCUMENTS

| 651984 | 10/1985 | (CH) | .............................. H04N/7/00 |
|---|---|---|---|
| 0 242 099 | 4/1987 | (EP) | ................................ G01S/5/14 |

OTHER PUBLICATIONS

Civil GPS from a Future Perspective, Thomas A. Stansell, Jr., Proceeding of the IEEE, vol. 71, No. 10, Oct. 1983.

* cited by examiner

Primary Examiner—Vu Le
(74) Attorney, Agent, or Firm—Womble Carlyle Sandridge & Rice

(57) ABSTRACT

A portable security system (1) consisting of an electronic camera module (2) with a lens (3), a Global Positioning System module (4) and a combined memory and transmitter module (5) which includes a microphone (7). When sound-activated via microphone (7) or activated by manual operation of the button (6), the camera module (2) photographs the scene and feeds the image to the transmitter module (5), also the Global Positioning System module (4) receives positional information for satellites and converts the received information into display information, and the transmitter module (5) transmits the image and the display information to a remote receiver (10) for conversion into a printed image on a facsimile receiver (15) and into a display of the transmitter's position on a map (11).

24 Claims, 1 Drawing Sheet

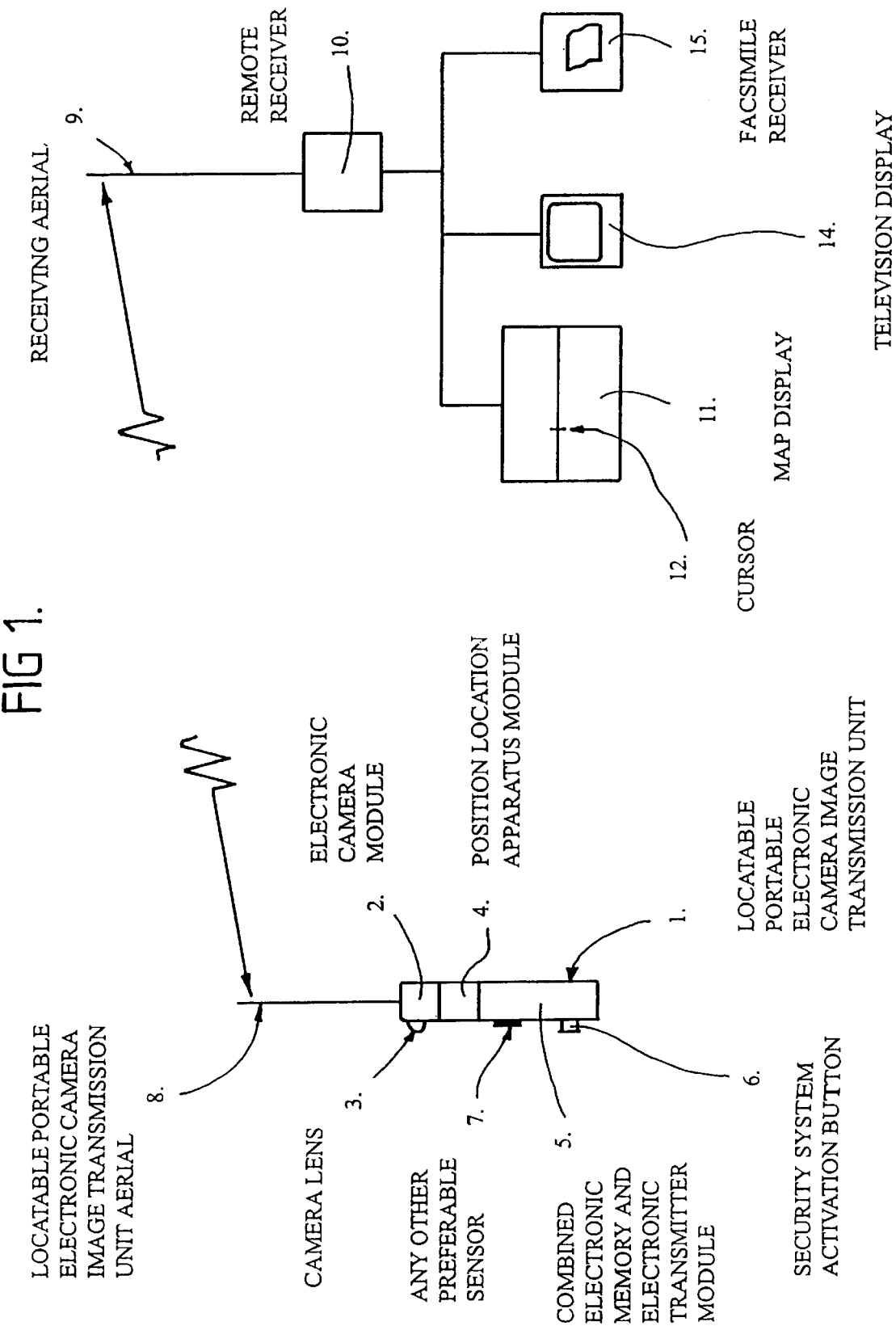

SECURITY SYSTEM WITH METHOD FOR LOCATABLE PORTABLE ELECTRONIC CAMERA IMAGE TRANSMISSION TO A REMOTE RECEIVER

CROSS REFERENCE TO RELATED APPLICATION

This is a continuation application of U.S. patent application Ser. No. 07/720,865 filed in the United States Patent and Trademark Office on Sep. 11, 1992 now U.S. Pat. No. 5,712,679.

BACKGROUND OF THE INVENTION

1. Field of the Invention

The present invention relates to a photographic security system.

2. Description of the Related Art

In U.S. Pat. No. 4,651,143 there is disclosed a security system including a television camera for taking a scene of a trespass upon a predetermined region at a site to be monitored, a video recorder for recording the image of the scene taken by the television camera, and a sensor for sensing a trespass and outputting a signal for starting the television camera and the video recorder. The signal output from the sensor for sensing a trespass and the outputs of a plurality of other sensors sensing other conditions at the site to be monitored are transmitted to a monitoring site remote from the site to be monitored for display at the monitoring site.

In EP-A-0242099 there is disclosed an anti-theft and locating system in which a microprocessor monitors vehicle personal position by way of coordinates obtained from Navstar Global Positioning System. Upon activation, through sensing unauthorized access to a vehicle or a change in its position, the microprocessor identifies itself to a central dispatch office and alerts the same to the nature of the disturbance. The system periodically updates vehicle location by way of digital signals sent to the central dispatch station by way of a cellular mobile telephone system. The central dispatch office can interrogate the microprocessor via the telephone link by addressing its unique serial number in order to obtain its position should the vehicle be stolen without activation of the microprocessor. A plurality of logic inputs and outputs are provided for accommodating conventional anti-vandalism and anti-theft detectors which may be integrated into the total protection system.

SUMMARY OF THE INVENTION

In accordance with the present invention there is provided a security apparatus comprising in combination an electronic camera and a transmitter for transmitting the image received by the electronic camera to a remote receiver characterised in that the apparatus is portable and includes a position location apparatus and in that the transmitter also transmits the positional information received from the position location apparatus.

The present invention also provides the combination of the aforesaid portable security apparatus and a remote receiving apparatus adapted to receive the information transmitted by the transmitter of the portable security apparatus.

BRIEF DESCRIPTION OF THE DRAWING

FIG. 1 is a diagrammatic view of the preferred embodiment of the security system.

DETAILED DESCRIPTION OF THE PREFERRED EMBODIMENT

The present invention will now be described, by way of example, with reference to FIG. 1 of the accompanying drawings which show schematically a portable photographic security apparatus of the present invention, in which the portable photographic security system transmitter 1 is made up from a number of interconnected elements, each of which is known per se as a separate unit, namely an electronic camera module 2, with a lens 3, a Global Positioning System (GPS) module 4, and a combined memory and transmitter module 5. The memory and transmitter module 5 preferably have an activation button 6 and provision is made for any other preferable sensor 7, for example, a microphone. This may be convenient to allow transmission of what may be heard being said. Again such a microphone may preferably activate the system if a loud noise such as a gunshot or scream takes place.

Any activation of the system will immediately cause the following to happen. One—calculation of the exact position of the portable photographic security system transmitter via the GPS module. Two—activate as necessary the electronic camera module to photograph the immediate area. Three—store all this information electronically within the internal memory while at the same time transmitting the name and address of the user, date, time of day, exact location, a photograph of the immediate area plus preferably sound.

All this information may preferably be transmitted using existing radio transmission systems, for example, cellular radio, via an aerial 8 to a receiving aerial 9 connected to a distant receiver 10. The receiver 10 may be in turn preferably connected to a map display 11. Map display 11 may preferably be so constructed as to be able to move a crosswire 12 immediately to show the actual location of the portable photographic security system transmitter 1 upon the map. The receiver 10 may preferably be connected to a television display 14, thus giving direct display of any visual picture and sound transmission, along with the other location and user information. The receiver 10 may also preferably be connected to a facsimile receiver 15 giving a hard copy of the transmitted image and information.

At first glance this combination of modules would appear to need a substantial size external package to hold them all. A GPS system as proposed by Philip G. Mattos "Global Positioning by Satellite", Electronics & Wireless World, February 1989 still needs a package volume of 80 mm by 125 mm by 25 mm. However, the capacity of the electronics within such a GPS system are known to be vastly underutilised. It is therefore possible to utilise this spare capacity to permit a substantial reduction of the volume mass of electronics which are required in the other modules. For example, the IMS T222 transputer (a new type of electronic chip) has the capacity of a 10 MIP parallel processing computer. Thus we can place all of the signal processing functions for all of the other modules onto such a transputer by simply scheduling any convenient sequence of software events to suit the particular needs.

The resulting small package of electronics creates a range of completely new products and markets. For example, a child or young girl on the way to or from school will be able to alert his or her parents to any potential danger en route. An attractive and vulnerable young woman walking home at night can alarm the police (or indeed any convenient person) of potential as well as actual danger.

Thus the proposed portable photographic security system will provide substantially enhanced security to any person travelling while at the same time simple adaptions will make possible the use of such a system in any vehicle or building.

While there has been shown a preferred and alternate embodiments of the present invention, it is to be understood that the invention may be embodied otherwise than is herein specifically shown and described, and that within the embodiments, certain changes may be made in the form and arrangements of the parts of the invention without departing from the underlying ideas or principles of the invention as set forth in the Claims appended herewith. In addition, the corresponding structures, materials, acts, and equivalents of all means or step plus function elements in the claims are intended to include any structure, material, or act for performing the functions in combination with other claimed elements, as specifically claimed herein.

What is claimed is:

1. A portable security transmitter, comprising:

selective transmission means for selectively transmitting a data stream;

a camera module coupled to said transmission means and for imaging a selected region in the vicinity of said portable security transmitter and converting the image to data for inclusion in said data stream;

a global positioning module coupled to said transmission means for receiving positioning signals from remote positioning transmitters, calculating the global position of said transmitter, and converting the global position to data for inclusion in said data stream; and activation means for selectively activating the transmission means to transmit a data stream including, at least, said converted image from said camera module and said global position.

2. The portable security transmitter of claim 1, further comprising audio receiving means coupled to said transmission means and for converting sound in the vicinity of said portable security transmitter to data for inclusion in said data stream.

3. The portable security transmitter of claim 2, wherein said audio receiving means includes a microphone.

4. The portable security transmitter of claim 3 further comprising a computer platform in operable connection to said selective transmission means, camera module, global positioning module, and activation means.

5. The portable security transmitter of claim 1, further comprising memory means for selectively storing said image and global position data prior to inclusion in said data stream.

6. The potable security transmitter of claim 1, wherein said global positioning module receives positioning signals from a Global Positioning Satellite (GPS) array.

7. The portable security transmitter of claim 6, wherein said selective transmission means selectively transmits a radio signal that carries said data stream.

8. The portable security transmitter of claim 7, wherein said camera module converts an image into a television signal for inclusion in said data stream.

9. The portable security transmitter of claim 1, wherein said activation means further comprises means for activating said transmitter upon occurrence of an audible event above a predefined threshold.

10. The portable security transmitter of claim 9 wherein said activation means further comprises manually operable activation means.

11. A digital process for operating a portable security transmitter comprising the steps of:

monitoring an activation means on a portable security transmitter;

calculating the global position of the transmitter by receiving signals from global positioning transmitters;

acquiring an image through a camera module of the transmitter upon activation of the activation means;

transmitting a data stream including, at least, the global position and the image; and storing the data stream substantially simultaneously on a memory means in the portable security transmitter.

12. The process of claim 11, further comprising the step of recording sound on an audio receiving means on the transmitter, whereby the sound is transmitted in the data stream and stored on the memory means.

13. The process of claim 11, wherein the step of calculating the global position of the transmitter comprising calculating the global position of the transmitter by utilizing the signals of the Global Positioning Satellite (GPS) array.

14. The process of claim 13, wherein the step of transmitting a data stream comprises transmitting a data stream carried by of a radio signal.

15. The process of claim 11, wherein the step of acquiring an image comprises acquiring an image in the form a television signal to be included in the data stream.

16. The process of claim 11, wherein the step of monitoring an activation means comprises monitoring an activation means for the occurrence of an audible event above a predetermined threshold.

17. The process of claim 11, wherein the step of monitoring an activation means comprises monitoring an activation means for a manual activation.

18. The process of claim 11, wherein the steps of the process are performed by software loaded upon computer hardware of the portable security transmitter.

19. A method of detecting a breach of security in a first location and providing information regarding the breach of security to security personnel in a remote location, said method comprising the steps of:

(a) upon the breach of security, acquiring an image of the first location and converting the image into transmittable data representative of the image;

(b) upon the breach of security, acquiring global positioning signals, calculating the position of the first location based upon the acquired global positioning signals, and converting the calculated position into transmittable data representative of the position;

(c) generating a transmittable signal that contains the data representative of the image and the data representative of the position;

(d) transmitting the transmittable signal to the remote location;

(e) receiving the transmitted signal at the remote location;

(f) at the remote location, extracting from the received signal the data representative of the image and the data representative of the position;

(g) at the remote location, reconstructing the image and the position from the extracted data; and (h) presenting the reconstructed image and position in a form usable by security personal to identify the location and nature of the breach of security.

20. A method of detecting a breach of security as claimed in claim 19 and further comprising, upon the breach of security, acquiring sounds from the vicinity of the breach and converting the acquired sounds into data representative of the sounds, and wherein step (c) further comprises generating a transmittable signal that contains the data representative of the image, the data representative of the position, and the data representative of the sounds, step (f) further comprises extracting from the received signal the data representative of the sounds, step (g) further comprises reconstructing the sounds from the extracted data, and step (h) further comprises presenting the reconstructed sounds in a form usable by security personnel.

21. A method of detecting a breach of security as claimed in claim 20 and further comprising the step of storing at least some of the data representative of the image, the location, and the sounds prior to transmitting the transmittable signal containing the data to the remote location.

22. A method of detecting a breach of security as claimed in claim 19 and further comprising the step of initiating steps (a) through (h) by activating a manually operable switch.

23. A method of detecting a breach of security as claimed in claim 19 and further comprising the step of initiating steps (a) through (h) when ambient sound in the vicinity of the breach of security exceeds a predetermined threshold.

24. A method of detecting a breach of security as claimed in claim 19 and wherein step (b) comprises acquiring the global positioning signals from the Global Positioning Satellite (GPS) array.

\* \* \* \* \*